3,347,624
METHOD OF PREPARING CALCIUM CARBONATE
Kirman Taylor, Painesville, Ohio, assignor to Diamond Alkali Company, Cleveland, Ohio, a corporation of Delaware
No Drawing. Filed May 26, 1965, Ser. No. 459,104
7 Claims. (Cl. 23—66)

ABSTRACT OF THE DISCLOSURE

Calcium carbonate can be readily produced in an easily filterable, finely-divided state by carbonating an aqueous milk of lime suspension in the presence of a water-soluble diamine compound such as hydrazine, ethylene diamine, p-phenylene diamine, etc. The calcium carbonate produced in this manner is especially suitable for use as a filler, pigment or extender.

---

The present invention relates to the production of calcium carbonate and more particularly to the production of an easily filterable, finely-divided calcium carbonate.

Calcium carbonate is used as (1) a filler for paper to impart to the paper desired porosity and opacity characteristics, (2) a filler in rubber to enhance its strength and (3) a pigment or extender in the paint industry. The production of high grade calcium carbonate of controlled physical characteristics, particularly controlled particle size, and chemical composition has been the subject of considerable study for many years. Although there are many reactions by which $CaCO_3$ may be produced, the production of this chemical in a desired fine particle size relatively free from objectionable minor impurities and on a commercial scale has been restricted to a relatively limited number of reactions governed principally by the types of raw material available.

While calcium carbonate is found in nature as limestone, it is not directly suitable in its natural state for the above uses because of the impurities contained therein and the difficulty in reducing the limestone particles to the desired size and shape. Consequently, it is the practice of the art to first calcine the limestone whereby carbon dioxide gas is driven off and any organic matter present is destroyed. The calcined material, referred to as quicklime, is then slaked with water whereby "crude" milk of lime is formed. Coarse aggregates and impurities are then removed as by classification procedures. The milk of lime, a suspension of finely divided calcium oxide, may then be treated to precipitate calcium carbonate by either contacting the milk of lime with a carbonate ion contributing material, such as carbon dioxide or sodium carbonate and the like, whereby calcium carbonate is formed; or reacting the milk of lime with ammonium chloride to form a solution of calcium chloride and ammonium hydroxide which is heated to decompose the ammonium hydroxide into water and ammonia, which is driven off. The calcium chloride is then contacted with sodium carbonate and calcium carbonate is precipitated and sodium chloride is formed.

Of the three commercially accepted processes for preparing calcium carbonate the so-called "carbonation" process generally has achieved the most widespread acceptance by calcium carbonate producers. This process generally comprises bubbling a gas containing carbon dioxide, which might be the carbon dioxide driven off during the calcination step, through the milk of lime. Carbon dioxide dissolves in the liquid to contribute the carbonate ion. Since milk of lime comprises a saturated solution of calcium oxide, which has a pH generally in excess of about 8.5, preferably up to about 12, calcium carbonate is formed and precipitates. The precipitated calcium carbonate is separated from the mother liquor, washed to remove reaction by-products and unreacted reactants, and then dried. Because of the tendency of the product to agglomerate during the drying step, the dried product may then be subjected to a light crushing operation to disintegrate the agglomerates.

In the development of processes for preparing calcium carbonate, it has long been recognized that the ultimate particle size of precipitated calcium carbonate controls many of the desired properties of this chemical compound, especially in its end uses. Consequently a great deal of effort has been spent in working out refinements on the basic commercial processes to obtain and control a desired fineness of particle size. For instance, reaction conditions such as pH, temperature, reactant concentration, reactant ratio and rates of addition have been explored. Also, variation in chemical composition of the reactants and variations in the manner of contacting the reactants have been tried. Further, the so-called "post-precipitation" treatments which generally involve subjecting the slurry of precipitated calcium carbonate to attrition, grinding and the like before removing the water and drying the solids have proved to be time consuming and expensive due to increased labor and equipment costs.

It has now been found that an easily filterable, finely-divided calcium carbonate can be produced by the addition to the milk of lime of a small amount of a water-soluble diamine compound having the amino groups as terminal groups on opposite ends of the molecule and selected from the group consisting of $NH_2(CH_2)_{n_1}NH_2$ and

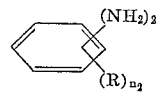

wherein $n_1$ is an integer selected from 0 and 2 to 6, inclusive, $n_2$ is an integer from 0 to 4 inclusive; and R is a lower alkyl group from 1 to 4 carbon atoms. Exemplary of such diamines include hydrazine, ethylene diamine, propylene diamine, butylene diamine, pentalene diamine, and hexalene diamine, p-phenylene diamine, 2,5-diamino toluene and 1,4-diamino-2,3,5,6-tetramethyl benzene (diaminodurene).

In the practice of the present invention for producing an easily filterable, finely-divided calcium carbonate, a milk of lime slurry is charged into a reaction zone with about 0.001 to 0.1, preferably 0.002 to 0.075 gram of the diamine per gram of calcium oxide in the milk of lime. A gas containing carbon dioxide, for example, waste gases, such as purified combustion, or lime kiln gas is dissolved in the milk of lime. The carbon dioxide dissolves in the slurry forming carbonate ions which contact the calcium ions in the aqueous medium and combine to form calcium carbonate which precipitates in the form of easily filterable, finely divided particles.

The temperatures within the reaction zone generally are maintained within the range from about 20° to 60° C., preferably about 20° to 40° C. Since the reaction is exothermic in nature the carbonation reaction may be started at room temperature but should be maintained within the above range by any suitable means. The carbonation of lime according to the present invention is not restricted to the use of any one type of carbonation apparatus and is independent of the apparatus. The inventive feature of the process is the addition of a diamine to the milk of lime prior to carbonation to produce an easily filterable, ultra-fine calcium carbonate. Generally, the calcium carbonates produced by the present process have particle sizes of less than 1 micron ($\mu$).

In addition to the diamine employed it has also been found that when a surface active agent is employed in conjunction with these additives in amounts from about 0.1 to 200, preferably 0.5 to 100 weight percent, based on the weight of the diamine, an appreciable increase in the crescent tear of rubber is observed. Suitable surface active agents include the kind referred to in the art as wetting, dispersing or emulsifying agents and include the anionic, cationic or non-ionic type such as those listed in articles by McCutcheon in Soap and Chemical Specialties, vol. 31, Nos. 7–10 (1955).

In order that those skilled in the art may more completely understand the present invention and the preferred methods by which the same may be carried into effect, the following specific example is offered.

*Example*

To 100-milliliter samples of a milk of lime suspension containing 133 g. CaO/liter are added various concentrations of hydrazine, added as the hydrate and hydrochloride, and ethylene diamine. While continuously stirring the suspension containing the additives, a gas stream containing carbon dioxide is introduced into the suspension causing precipitation of the calcium carbonate. Carbonations are started at room temperature and unless noted otherwise the temperature of the reactants in the reaction zone rose to about 40° C. and maintained there. The precipitated calcium carbonate is filtered off, washed, dried and broken up by milling into fine particles. For comparison, the rubber evaluation, i.e., crescent tear, tensile strengths, modulus, of the calcium carbonates prepared by the process of the present invention and two commercial calcium carbonate products, Multifex MM which is produced by the Diamond Alkali Company and Purecal SC which is produced by Wyandotte Chemicals Corporation, are evaluated. The results are presented in the table below.

It is to be understood that although the invention has been described with specific reference to particular embodiments thereof, it is not to be so limited, since changes and alterations therein may be made which are within the full intended scope of this invention as defined by the appended claims.

What is claimed is:
1. In a process for the manufacture of calcium carbonate by reacting an aqueous suspension of calcium oxide with a gas containing carbon dioxide under conditions to effect carbonation, the improvement which comprises effecting the reaction in the presence of about 0.001 to 0.1 gram per gram of calcium oxide of a water soluble diamine compound having the amino groups as terminal groups on opposite ends of the molecule selected from the group consisting of $H_2N(CH_2)_{n_1}NH_2$ and

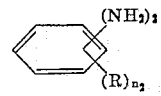

wherein $n_1$ is an integer selected from 0 and 2 to 6, $n_2$ is an integer from 0 to 4 inclusive, and R is a lower alkyl radical from 1 to 4 carbon atoms.

2. The process of claim 1 wherein the carbonation reaction is effected at a temperature within the range of 20° to 60° C.

3. The process of claim 1 wherein the carbonation reaction is effected in the presence of a water soluble diamine having the structure $H_2N(CH_2)_{n_1}NH_2$, wherein $n_1$ is an integer selected from 0 and 2 to 6.

4. The process according to claim 3 wherein the reaction is effected in the presence of hydrazine.

5. The process according to claim 3 wherein the reaction is effected in the presence of ethylene diamine.

6. The process of claim 1 wherein the reaction mixture additionally includes a surface active agent.

7. The process of claim 6 wherein the surface active agent is present in the reaction mixture in amounts of about 0.5 to 100 weight percent, based on the weight of the diamine.

TABLE

| Sample No. | Additive | Particle Size Microns ($\mu$) | Maximum Crescent Tear | Maximum Tensile Strength at Break (p.s.i.) | Maximum 500+ Modulus |
|---|---|---|---|---|---|
| 1 | 0.25 g. $N_2H_4.H_2O$ | 0.08 | 229 | 2,510 | 1,820 |
| 2 | 0.5 g. $N_2H_4.H_2O$ | 0.07 | 487 | 3,040 | 2,290 |
| 3 | 1 g. $N_2H_4.HCl$ | 0.07 | 495 | 3,210 | 1,960 |
| 4 | 1 g. $N_2H_4.HCl$ plus 0.08 g. Carbowax 20 M[1] | 0.07 | 562 | 3,350 | 1,800 |
| | 3 g. $H_2NCH_2CH_2NH_2$ | 0.06 | | | |
| 5 | { Multifex MM | 0.08 | 398 | 3,060 | 2,160 |
| | { Purecal SC | 0.095 | 439 | 3,175 | 2,025 |

[1] A polyethylene glycol surface active agent manufactured by Union Carbide Corp.

References Cited

UNITED STATES PATENTS

| | | | |
|---|---|---|---|
| 2,692,871 | 10/1954 | Pechukas | 106—308 |
| 2,709,160 | 5/1955 | Korejwa et al. | |
| 2,768,060 | 10/1956 | Follows | 23—64 |
| 2,841,504 | 7/1958 | Liggett. | |
| 2,927,091 | 3/1960 | Liggett. | |
| 2,964,382 | 12/1960 | Hall | 23—66 |

OTHER REFERENCES

Diamond Precipitated Calcium Carbonates for the Rubber Industry, Diamond Alkali Company, 1953, page 9.

OSCAR R. VERTIZ, *Primary Examiner.*

G. T. OZAKI, *Assistant Examiner.*